US005523773A

United States Patent [19]

Arakawa et al.

[11] Patent Number: 5,523,773
[45] Date of Patent: Jun. 4, 1996

[54] DISPLAY DRIVING/CONTROLLING INTEGRATED CIRCUIT AND DISPLAY SYSTEM

[75] Inventors: Takashi Arakawa, Nagoya; Kinya Sakaki, Tokyo, both of Japan

[73] Assignee: Kabushiki Kaisha Toshiba, Kawasaki, Japan

[21] Appl. No.: 395,202

[22] Filed: Feb. 27, 1995

Related U.S. Application Data

[63] Continuation of Ser. No. 108,002, Aug. 18, 1993, abandoned, which is a continuation of Ser. No. 858,608, Mar. 27, 1992, abandoned.

[30] Foreign Application Priority Data

Mar. 30, 1991 [JP] Japan .................................... 3-091011

[51] Int. Cl.[6] ........................................ H04N 1/00

[52] U.S. Cl. ........................................ 345/98; 345/103

[58] Field of Search ........................ 345/87, 98, 100, 345/103, 196, 197, 198, 205, 84, 126; 340/727, 799, 798, 718, 783, 766, 717; 348/790

[56] References Cited

U.S. PATENT DOCUMENTS

| | | | |
|---|---|---|---|
| 4,266,225 | 5/1981 | Burnett et al. | 340/766 |
| 4,326,201 | 4/1982 | Enokizono | 340/717 |
| 4,740,786 | 4/1988 | Smith | 340/752 |
| 4,768,029 | 8/1988 | Burrows | 340/799 |
| 4,983,958 | 1/1991 | Carrick | 340/798 |
| 5,023,438 | 4/1991 | Wakatsuki et al. | 340/727 |
| 5,161,220 | 11/1992 | Watanabe | 340/735 |

FOREIGN PATENT DOCUMENTS

| | | |
|---|---|---|
| 0055676 | 7/1982 | European Pat. Off. . |
| 0216188 | 4/1987 | European Pat. Off. . |
| 2106689 | 4/1983 | United Kingdom . |

*Primary Examiner*—Richard Hjerpe
*Assistant Examiner*—Kara Farnandez Stoll
*Attorney, Agent, or Firm*—Finnegan, Henderson, Farabow, Garrett & Dunner

[57] ABSTRACT

A display driving/controlling integrated circuit includes a display memory for storing data to be supplied to a display unit, a bus line of n-bit configuration for transmitting display data to be stored in the display memory, with n bits set as one unit, and a data array direction selection circuit connected to the bus line, for outputting display data on the bus line to the display memory with the bit array thereof kept in the original bit array status or outputting the display data to the display memory with the bit array thereof inverted with respect to the original bit array. There is provided means for writing display data with the bit array thereof inverted with respect to the original bit array when the display data is written into the display memory. Therefore, when the display panel is divided into upper and lower sections and driving LSIs have to be used for the upper and lower sections, wirings between the LSI output terminals and the display panel can be simplified and the wiring connections can be easily made.

12 Claims, 9 Drawing Sheets

| OUTPUT TERMINAL / MODE | S1 | S2 | S3 | S4 | S5 | S6 | S7 | S8 | S9 | S10 | S11 | S12 | S13 | S14 | S15 | S16 | ----- | S78 | S79 | S80 |
|---|---|---|---|---|---|---|---|---|---|---|---|---|---|---|---|---|---|---|---|---|
| NON-INVERTING MODE | DB0 | DB1 | DB2 | DB3 | DB4 | DB5 | DB6 | DB7 | DB0 | DB1 | DB2 | DB3 | DB4 | DB5 | DB6 | DB7 | ----- | DB5 | DB6 | DB7 |
| INVERTING MODE | DB7 | DB6 | DB5 | DB4 | DB3 | DB2 | DB1 | DB0 | DB7 | DB6 | DB5 | DB4 | DB3 | DB2 | DB1 | DB0 | ----- | DB2 | DB1 | DB0 |

FIG. 6

| SWAP \ OUTPUT | BUS7 | BUS6 | BUS5 | BUS4 | BUS3 | BUS2 | BUS1 | BUS0 |
|---|---|---|---|---|---|---|---|---|
| SWAP = 0 | DB0 | DB1 | DB2 | DB3 | DB4 | DB5 | DB6 | DB7 |
| SWAP = 1 | DB7 | DB6 | DB5 | DB4 | DB3 | DB2 | DB1 | DB0 |

DISPLAY DRIVING/CONTROLLING INTEGRATED CIRCUIT AND DISPLAY SYSTEM

This application is a continuation, of application Ser. No. 08/108,002, filed Aug. 18, 1993, now abandoned, which was a continuation of application Ser. No. 07/858,608, filed Mar. 27, 1992, now abandoned.

BACKGROUND OF THE INVENTION

1. Field of the Invention

The present invention relates to a display driving/controlling integrated circuit for supplying display data to a display unit such as a dot matrix display unit for effecting the 2-dimensional image display, and to a display system using the integrated circuit and, more particularly, to a display driving/controlling integrated circuit having a display memory for storing display data.

2. Description of the Related Art

When a display device such as a dot matrix type liquid crystal display device having a large number of display pixels is driven and controlled, an entire area of the display pixels is divided into a plurality of pixel areas and a display driving/controlling integrated circuit is provided for each divided pixel area.

FIG. 1 is a block diagram showing a display unit and a display driving/controlling integrated circuit. In FIG. 1, X indicates a number of pixels in a column direction of a display unit 90 and Y indicates a number of pixels in the a direction thereof. Further, Xa indicates a number of memory cells in a column direction of a display memory 92 disposed in a display driving/controlling integrated circuit 91 for controlling the display operation of the display unit 90 and Ya indicates a number of memory cells in a row direction thereof. For simplicity, in FIG. 1, only one display driving/controlling integrated circuit 91 is shown. If the total number of pixels in the display unit 90 is larger than the memory capacity of the display memory in the display driving/controlling integrated circuit 91, for example, if Y>Ya and X>Xa, the display unit 90 cannot be driven by use of only one display driving/controlling integrated circuit 91. Therefore, the entire area of the display pixels of 10 the display unit 90 is divided into a plurality of pixel areas and a plurality of display driving/controlling integrated circuits are used to drive the respective divided pixel areas. In the example of FIG. 1, that area of the display unit 90 which can be driven by one of the display driving/controlling integrated circuits 91 is a partial area $A_{XY}$ indicated by a hatched portion.

As shown in FIG. 2, when the display unit 90 is divided into four areas, four display driving/controlling integrated circuits 91*a* to 91*d* are provided to drive the respective four divided areas. The display driving/controlling integrated circuits 91*a* to 91*d* are supplied with data DB0 to DB7 from a CPU via a common data bus 93. That is, the four display driving/controlling integrated circuits 91*a* to 91*d* are allotted for the four divided areas of the display unit 90.

In order to make the type of integrated circuits uniform and lower the cost thereof, the same type of integrated circuits with the same arrangement, of input terminals for data DB0 to DB7 and output terminals S1 to S80 for driving signals are generally used as the four display driving/controlling integrated circuits 91*a* to 91*d*. Since the driving signals output from the output terminals S1 to S80 are supplied to segment lines (not shown) of the display unit 90 and the arrangement of the segment lines of the display unit 90 coincides with the arrangement of the output terminals of the integrated circuit in the two display driving/controlling integrated circuits 91*a* and 91*b*, which lie below the display unit 90 in FIG. 2, wirings between the display unit and the integrated circuits can be easily made. However, in FIG. 2, since the arrangement of the segment lines of the display unit 90 has an inverted relation with respect to the arrangement of the output terminals of the integrated circuits in the two display driving/controlling integrated circuits 91*c* and 91*d*, which lie above the display unit 90, special care must be taken when connecting wirings between the integrated circuits and the display unit 90.

For example, as shown in FIG. 3, the lower-side display driving/controlling integrated circuits 91*a* and 91*b* are mounted on the front surfaces of flexible wiring boards 95 and the wirings formed on the same surface of the flexible wiring boards 95 are connected to the segment lines of the display unit 90 as they are. However, the upper-side display driving/controlling integrated circuits 91*c* and 91*d* are mounted on the rear surfaces of respective flexible wiring boards 95, and in this case, the wirings formed on the rear surfaces of the flexible wiring boards must be re-arranged on the respective front surfaces thereof. At this time, it is required to form through hole connecting portions 95*a* in the flexible wiring board 95. However, if a necessary flexible wiring board 95 is prepared and the through hole connecting portions 95*a* are formed therein, the cost will become high. Further, in some cases, it is impossible to form an integrated circuit on the rear surface of the flexible wiring board 95.

SUMMARY OF THE INVENTION

The present invention has been made in view of the above drawbacks. It is an object of the present invention to provide a display driving/controlling integrated circuit that can be easily connected with a display unit having a display panel divided into upper and lower sections and a display system using the integrated circuit.

A display driving/controlling integrated circuit of the present invention comprises a display memory for storing data to be supplied to a display unit; a bus line of n-bit configuration for transmitting display data to be stored in the display memory with n bits set as one unit; and a data array direction selection circuit connected to the bus line, for outputting display data on the bus line to the display memory with the bit array thereof kept in the original bit array status or outputting the display data to the display memory with the bit array thereof inverted with respect to the original bit array.

A display system of the present invention comprises a display unit having a plurality of display pixels which are divided into a plurality of pixel areas; and a plurality of display driving/controlling integrated circuits respectively provided for the plurality of pixel areas of the display unit; each of the plurality of display driving/controlling integrated circuits including a display memory for storing data to be supplied to the display unit, an internal bus line of n-bit configuration for transmitting display data to be stored in the display memory with n bits set as one unit; and a data array direction selection circuit connected to the internal bus line, for outputting display data on the internal bus line to the display memory with the bit array thereof kept in the original bit array status or outputting the display data to the display memory with the bit array thereof inverted with respect to the original bit array status.

In the present invention, the data array direction selection circuit is provided in the preceding stage of the display memory for storing data to be supplied to the display unit and display data on the bus line is output to the display memory with the bit array thereof kept in the original bit array status or with the bit array thereof inverted with respect to the original bit array by means of the data array direction selection circuit. Therefore, the data array can be changed in the integrated circuit and thus the practical arrangement of the output terminals can be changed in the same type of display driving/controlling integrated circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a diagram showing the bit array status of data output from the display driving/controlling integrated circuit of FIG. 4;

DETAILED DESCRIPTION OF THE PREFERRED EMBODIMENTS

There will now be described an embodiment of a display driving/controlling integrated circuit and an embodiment of a display system according to this invention with reference to the accompanying drawings.

Figure 1:
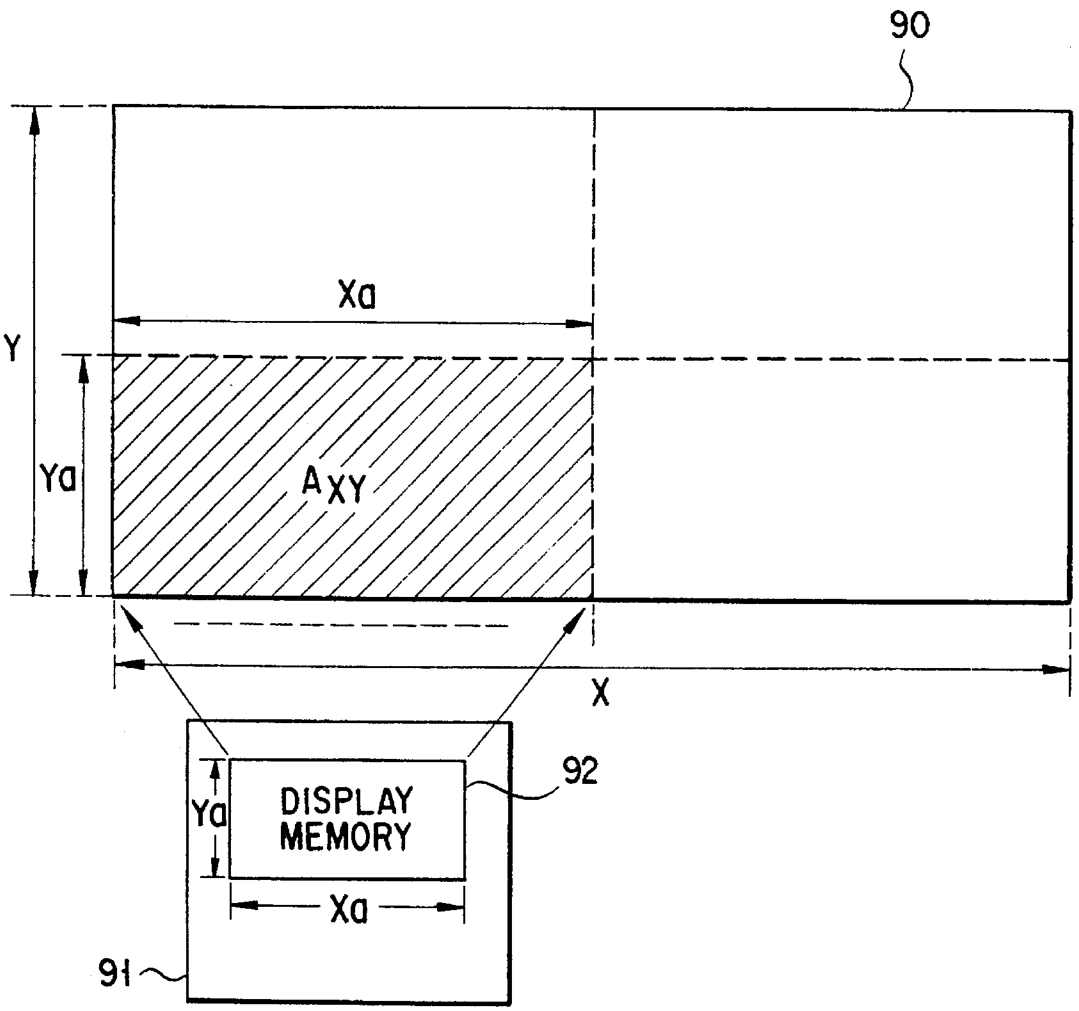
F I G. 1 (PRIOR ART)
FIG. 1 is a block diagram showing a display unit and a display driving/controlling integrated circuit.
Figure 2:
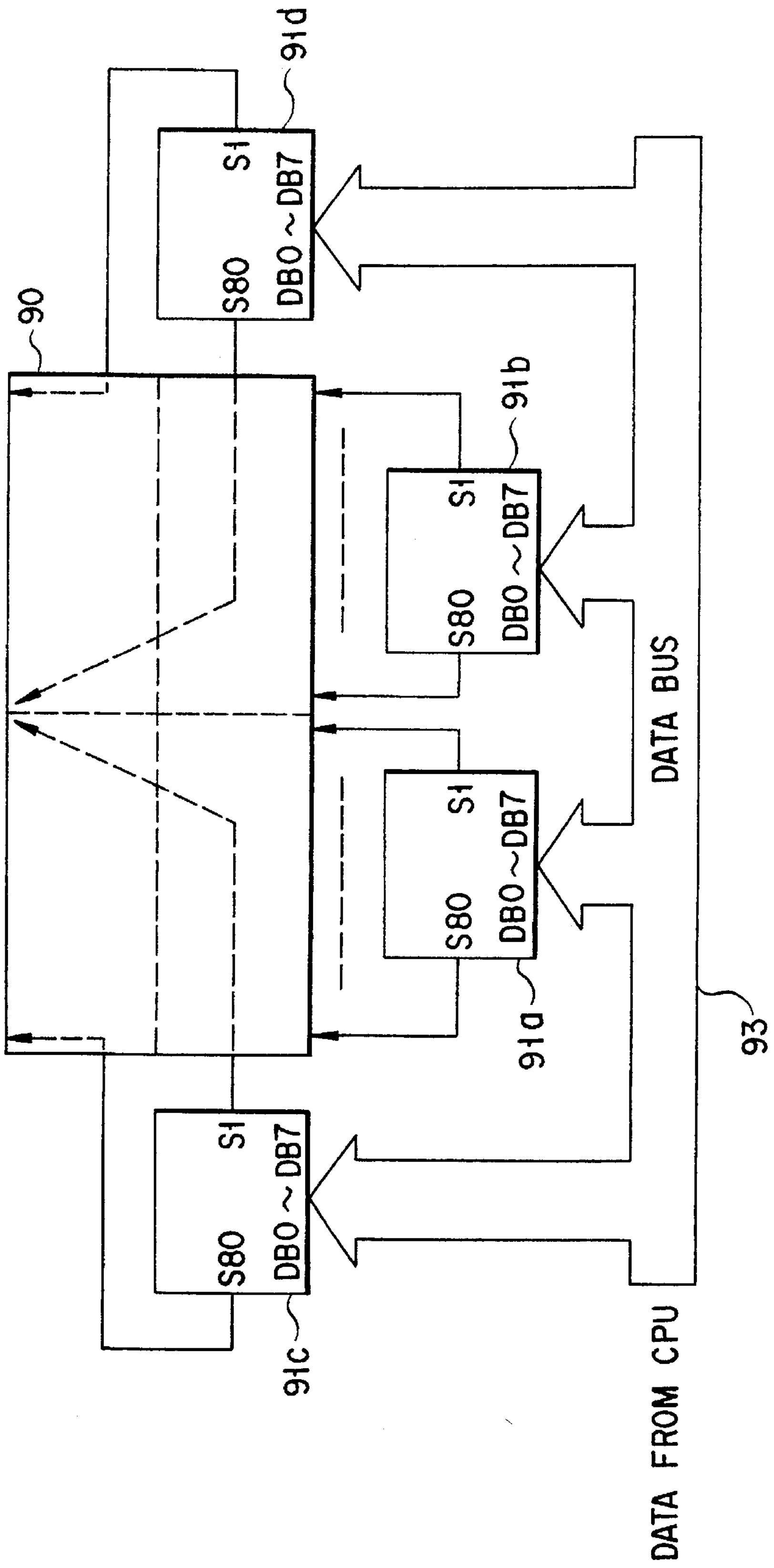
FIG. 2 (PRIOR ART)
FIG. 2 is a block diagram showing the construction of a display system using a conventional display driving/controlling integrated circuit.
Figure 3:
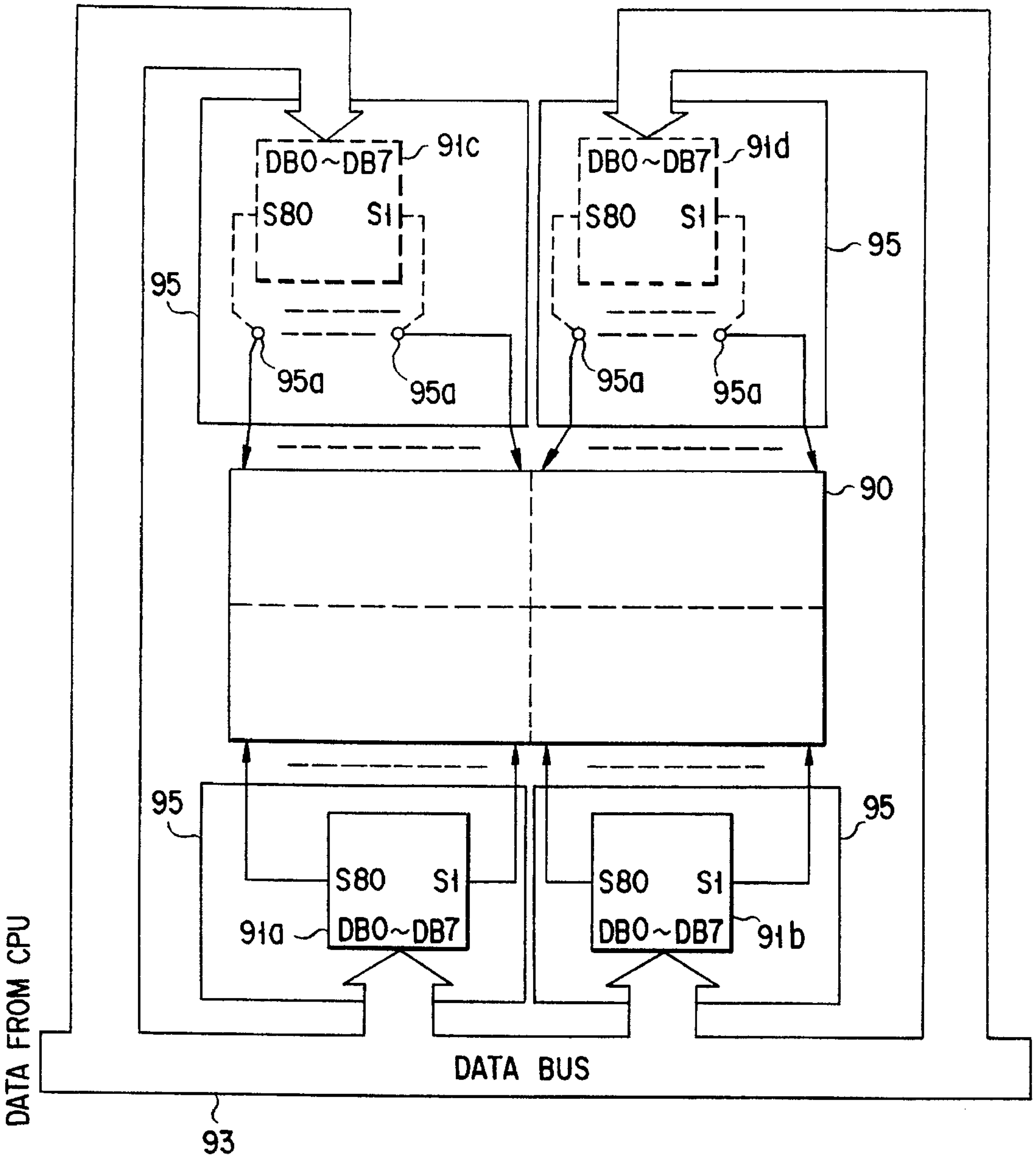
F I G. 3 (PRIOR ART)
FIG. 3 is a block diagram showing %he construction of a display system using another conventional display driving/controlling integrated circuit.
Figure 4:
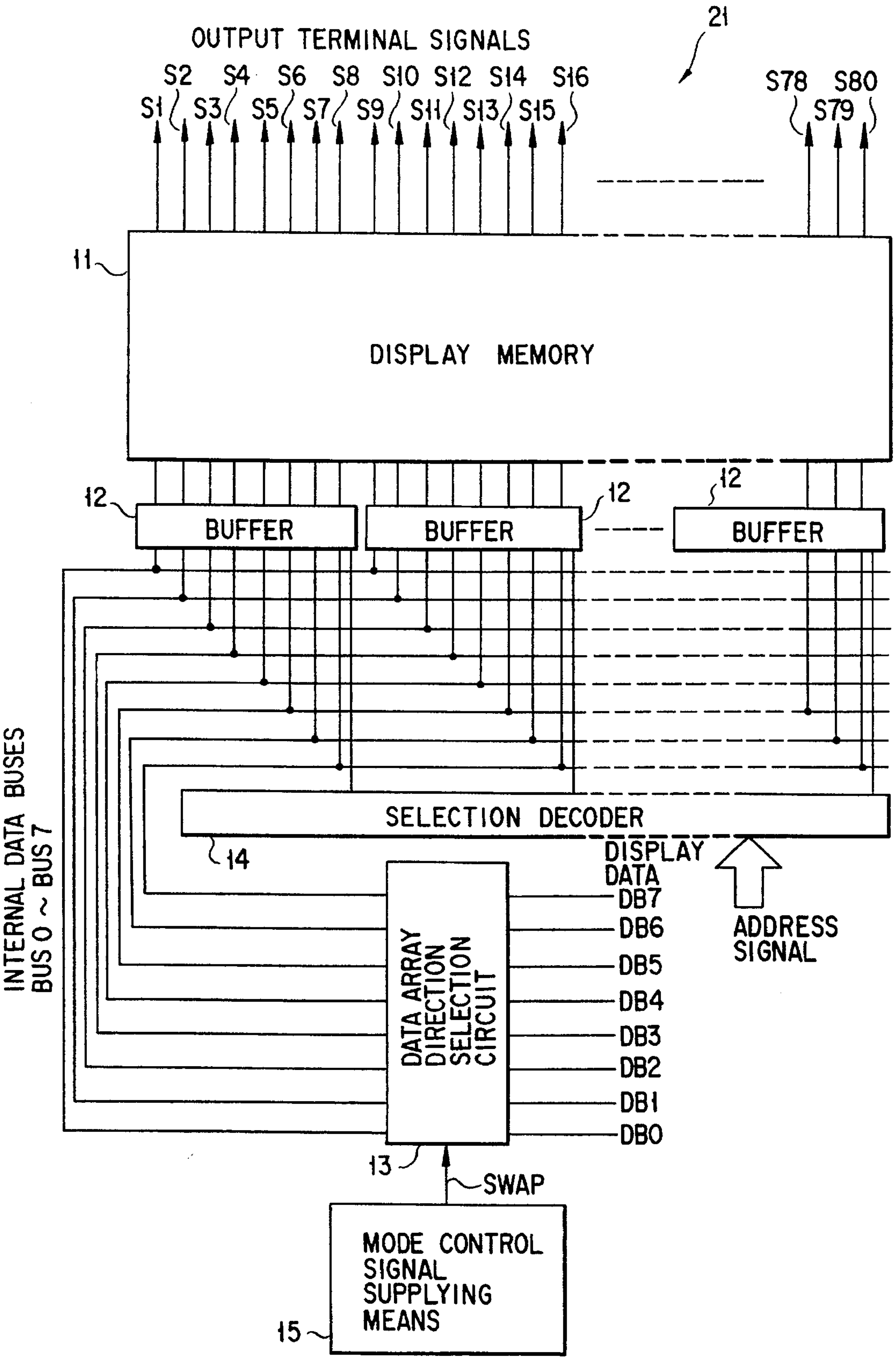
FIG. 4 is a block diagram showing the construction of a main portion of a display driving/controlling integrated circuit according to the present invention.

FIG. 4 is a block diagram showing the construction of the main portion of a display driving/controlling integrated circuit 21 according to the present invention. As shown in FIG. 4, a display memory 11 formed of a RAM containing display image data is provided in the display driving/controlling integrated circuit 21. For example, memory cells (not shown) are arranged in a matrix form with 80 rows and 64 columns in the display memory 11. Signals output from 80 output signal terminals S1 to S80 of the display memory 11 are supplied to segment lines of one of equally divided areas of a display unit (not shown). For example, ten buffers 12 each having an 8-bit input/output capacity are provided on the input side of the display memory 11. The 10 buffers 12 are connected to internal data buses BUS0 to BUS7 of 8-bit configuration, for example.

The internal data buses BUS0 to BUS7 are supplied with outputs of a data array direction selection circuit 13. The data array direction selection circuit 13 is supplied with display data items DB0 to DB7 of plural bits, for example, 8 bits, and outputs the display data items DB0 to DB7 to the internal data buses BUS0 to BUS7 after controlling the array status of the display data items DB0 to DB7 according to the logic level of a mode control signal SWAP supplied from a mode control signal supplying means 15. For example, the data array direction selection circuit 13 outputs the input data items DB0 to DB7 to the internal buses BUS0 to BUS7 as they are with the bit array status thereof kept unchanged when the mode control signal SWAP is set at a "1" level indicating a non-inverting mode. The data array direction selection circuit 13 outputs the input data items DB0 to DB7 to the internal buses BUS0 to BUS7 after inverting the bit array status thereof when the mode control signal SWAP is set at a "0" level indicating an inverting mode. That is, whether the array direction of data bits is kept unchanged or inverted is determined by the mode control signal SWAP when display data is written into the display memory 11 from the buffer 12. An address signal for the display memory 11 is input to a selection decoder 14 to specify a display area of the display memory 11. The ten buffers 12 are supplied with outputs of the selection decoder 14. Each of the buffers 12 permits selection of a storage area for the memory according to an address signal output of the selection decoder 14 and selectively takes in 8-bit data transferred via the internal data buses BUS0 to BUS7. The 8-bit data stored in each of the buffers 12 is output and stored into a corresponding display area of the display memory 11 at a predetermined timing.

Figure 5:
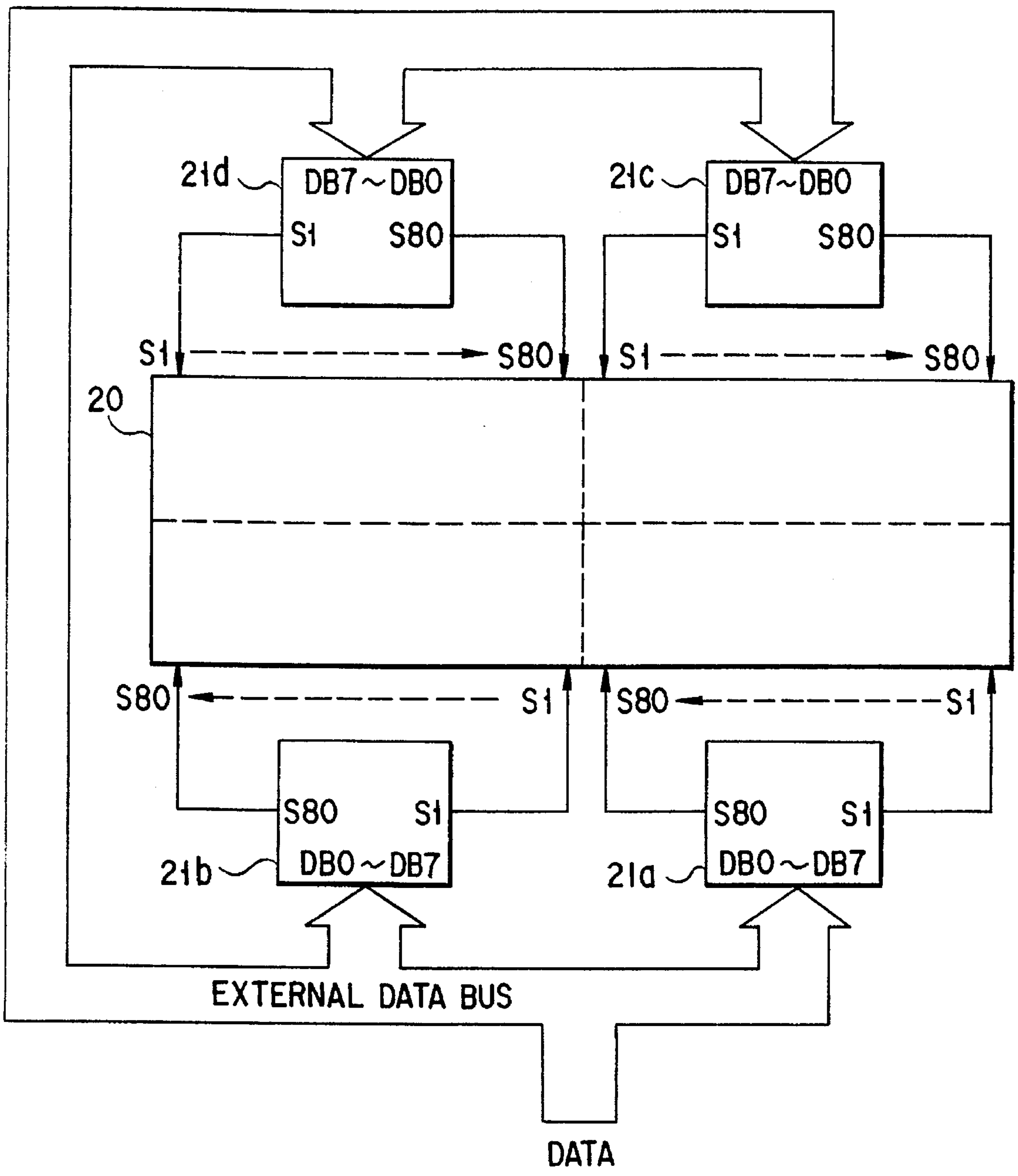
FIG. 5 is a block diagram of a display system using the display driving/controlling integrated circuit of FIG. 4.

FIG. 5 is a block diagram showing the schematic construction of a display system using the display driving/controlling integrated circuit 21 of FIG. 4. In this display system, each of divided areas of the entire display pixel area of the display unit is driven by a corresponding one of display driving/controlling integrated circuits 21. For example, in order to drive a display unit 20 in which the display panel is divided into upper and lower sections and display pixels are equally divided into four areas as in the display system shown in FIG. 5, four display driving/controlling integrated circuits having the same construction as the display driving/controlling integrated circuit of FIG. 4 are used. In FIG. 5, the four display driving/controlling integrated circuits are denoted by reference numerals 21*a* to 21*d*.

In the display driving/controlling integrated circuit 21 with the above construction, the data array direction selection circuit 13 outputs input data items DB0 to DB7 to the internal buses BUS0 to BUS7 as they are with the array status thereof kept unchanged when the mode control signal SWAP is set at the "1" level indicating the non-inverting mode. That is, the least significant bit data DB0 is output to the internal data bus BUS0 of the least significant bit position and the most significant bit data DB7 is output to the internal data bus BUS7 of the most significant bit position. Then, 8-bit data which is first output to the internal buses BUS0 to BUS7 is stored into one of the buffers 12, which is disposed on the leftmost position according to the output of the selection decoder 14, and then stored into a preset storage area of the display memory 11. Likewise, each time 8-bit data is supplied, the data array direction selection circuit 13 outputs input data items DB0 to DB7 to the internal buses BUS0 to BUS7 with the array status thereof kept unchanged and the 8-bit data transferred via the internal data buses BUS0 to BUS7 is sequentially stored into the remaining nine buffers 12 which are disposed on the right-hand side of the buffer into which the 8-bit data has been first stored. Thus, after 8-bit data is supplied to the data array direction selection circuit 13 ten times, data will be stored into all of the memory cells or 80 memory cells of one column of the display memory 11. After data is thus stored into all of the rows of the display memory 11, previously stored data is read out to drive the display unit 20. In the readout operation, the relation indicating the non-inverting mode as shown in FIG. 6 can be set up between signals output from the 80 output terminals S1 to S80 and 8-bit input data items DB0 to DB7. That is, the array status of the output signals of the output terminals S1 to S80 is set to correspond to the array status of the input data items obtained by serially arranging groups of 8-bit input data items DB0 to DB7 without changing the array direction of the input data items DB0 to DB7 supplied to the data array direction selection circuit 13.

On the other hand, in the display driving/controlling integrated circuit 21, when the mode control signal SWAP is set at the "0" level indicating the inverting mode, the data array direction selection circuit 13 outputs the input data items DB0 to DB7 to the internal buses BUS0 to BUS7 after inverting the array status thereof. That is, the least significant bit data DB0 is output to the internal data bus BUS7 of the most significant bit position and the most significant bit data DB7 is output to the internal data bus BUS0 of the least significant bit position. Then, when data is read out after data is stored into all of the rows of the display memory 11, the relation indicating the inverting mode as shown in FIG. 6 is set up between signals output from the 80 output terminals S1 to S80 of the display memory 11 and 8-bit input data items DB0 to DB7. That is, the array status of the output signals of the output terminals S1 to S80 is set to correspond to the array status of the input data items obtained by serially arranging groups of 8-bit input data items DB0 to DB7 in a reverse order with the array direction of the input data items DB0 to DB7 inverted with respect to the initial array direction of the 8-bit input data items DB0 to DB7 supplied to the data array direction selection circuit 13. Therefore, in the display driving/controlling integrated circuit 21 in which the mode control signal SWAP is set at the "0" level, the bit array of data output from the output terminals S1 to S80 is inverted with respect to that in the display driving/controlling integrated circuit 21 in which the mode control signal SWAP is set at the "1" level.

In order to drive the display unit 20 of FIG. 5, four display driving/controlling integrated circuits which have the same construction as the display driving/controlling integrated circuit 21 of FIG. 4 are used, the mode control signal SWAP is set at the "1" level to set the non-inverting mode in two display driving/controlling integrated circuits 21*a* and 21*b* which are arranged on the lower side of the display unit 20, and the mode control signal SWAP is set at the "0" level to set the inverting mode in two display driving/controlling integrated circuits 21*c* and 21*d* which are arranged on the upper side of the display unit 20. As a result, the array of signals output from the output terminals S80 to S1 of the two display driving/controlling integrated circuits 21*c* and 21*d* which are set in the inverting mode becomes equal to the array of signals output from the output terminals S1 to S80 of the two display driving/controlling integrated circuits 21*a* and 21*b* which are set in the non-inverting mode. Therefore, as shown in FIG. 5, the upper-side display driving/controlling integrated circuits 21*c* and 21*d* and the lower-side display driving/controlling integrated circuits 21*a* and 21*b* can be arranged along the upper and lower columns of the display unit 20. As a result, the output terminals S1 to S80 of the two display driving/controlling integrated circuits 21*c* and 21*d* disposed on the upper side of the display unit 20 can be directly connected to segment lines of the display unit 20 like the two display driving/controlling integrated circuits 21*a* and 21*b* disposed on the lower side of the display unit 20. Thus, unlike the conventional case, in the present invention, it is not necessary to form through hole connecting portions in the flexible wiring board and the connection between the display driving/controlling integrated circuits 21*a* to 21*d* and the display unit 20 can be easily made.

Figures 7, 8:
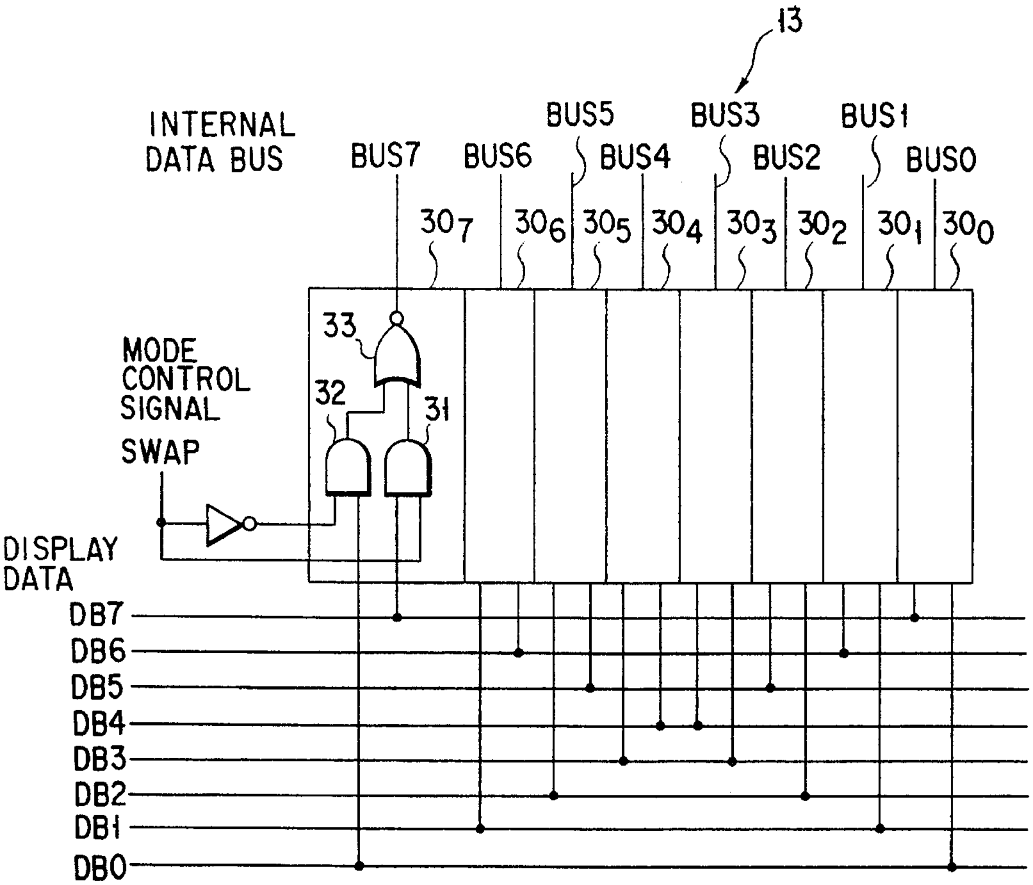
FIG. 7 is a circuit diagram showing the detailed construction of a data array direction selection circuit in the display driving/controlling integrated circuit of FIG. 4.
FIG. 8 is a diagram showing the bit array status of data output from the data array direction selection circuit of FIG. 7.

FIG. 7 is a circuit diagram showing the detailed construction of the data array direction selection circuit 13 according to the embodiment of FIG. 4. The data array direction selection circuit 13 includes eight data selection circuits $\mathbf{30}_0$ to $\mathbf{30}_7$. As typically shown by the data selection circuit $\mathbf{30}_7$, each of the data selection circuits includes two 2-input AND gates 31 and 32, and a NOR gate 33 supplied with outputs of the AND gates 31 and 32. An inverted signal of the mode control signal SWAP is commonly supplied to the first input terminals of the AND gates 31 of all of the data selection circuits $\mathbf{30}_0$ to $\mathbf{30}_7$ and the mode control signal SWAP is commonly supplied to the first input terminals of the AND gates 32. In the data selection circuit $\mathbf{30}_7$, the second input terminal of the AND gate 31 is supplied with the input data DB7 and the second input terminal of the AND gate 32 is supplied with the input data DB0. In the data selection circuit $\mathbf{30}_6$, the second input terminal of the AND gate 31 is supplied with the input data DB6 and the second input terminal of the AND gate 32 is supplied with the input data DB1. In the data selection circuit $\mathbf{30}_5$, the second input terminal of the AND gate 31 is supplied with the input data DB5 and the second input terminal of the AND gate 32 is supplied with the input data DB2. In the data selection circuit $\mathbf{30}_4$, the second input terminal of the AND gate 31 is supplied with the input data DB4 and the second input terminal of the AND gate 32 is supplied with the input data DB3. In the data selection circuit $\mathbf{30}_3$, the second input terminal of the AND gate 31 is supplied with the input data DB3 and the second input terminal of the AND gate 32 is supplied with the input data DB4. In the data selection circuit $\mathbf{30}_2$, the second input terminal of the AND gate 31 is supplied with the input data DB2 and the second input terminal of the AND gate 32 is supplied with the input data DB5. In the data selection circuit $\mathbf{30}_1$, the second input terminal of the AND gate 31 is supplied with the input data DB1 and the second input terminal of the AND gate 32 is supplied with the input data DB6. In the data selection circuit $\mathbf{30}_0$, the second input terminal of the AND gate 31 is supplied with the input data DB0 and the second input terminal of the AND gate 32 is supplied with the input data DB7. Outputs of the NOR gates 33 of the data selection circuits $\mathbf{30}_0$ to $\mathbf{30}_7$ are respectively supplied to the internal data buses BUS0 to BUS7.

When the mode control signal SWAP is set at the "1" level to set the non-inverting mode in the data array direction selection circuit 13, the AND gate 31 of each of the data selection circuits is selected. Therefore, the input data items DB0 to DB7 are output to the internal data buses BUS0 to BUS7 with the array status thereof kept unchanged. However, the logic levels of the data items output to the internal data buses BUS0 to BUS7 are inverted with respect to those of the original input data items DB0 to DB7. When the mode control signal SWAP is set at the "0" level to set the inverting mode, the AND gate 32 of each of the data selection circuits is selected. Therefore, the input data items DB0 to DB7 are output to the internal data buses BUS0 to BUS7 with the array thereof inverted with respect to the initial data array.

FIG. 8 shows the array status of data items output to the internal data buses BUS0 to BUS7 in the non-inverting and inverting modes.

Figure 9A:
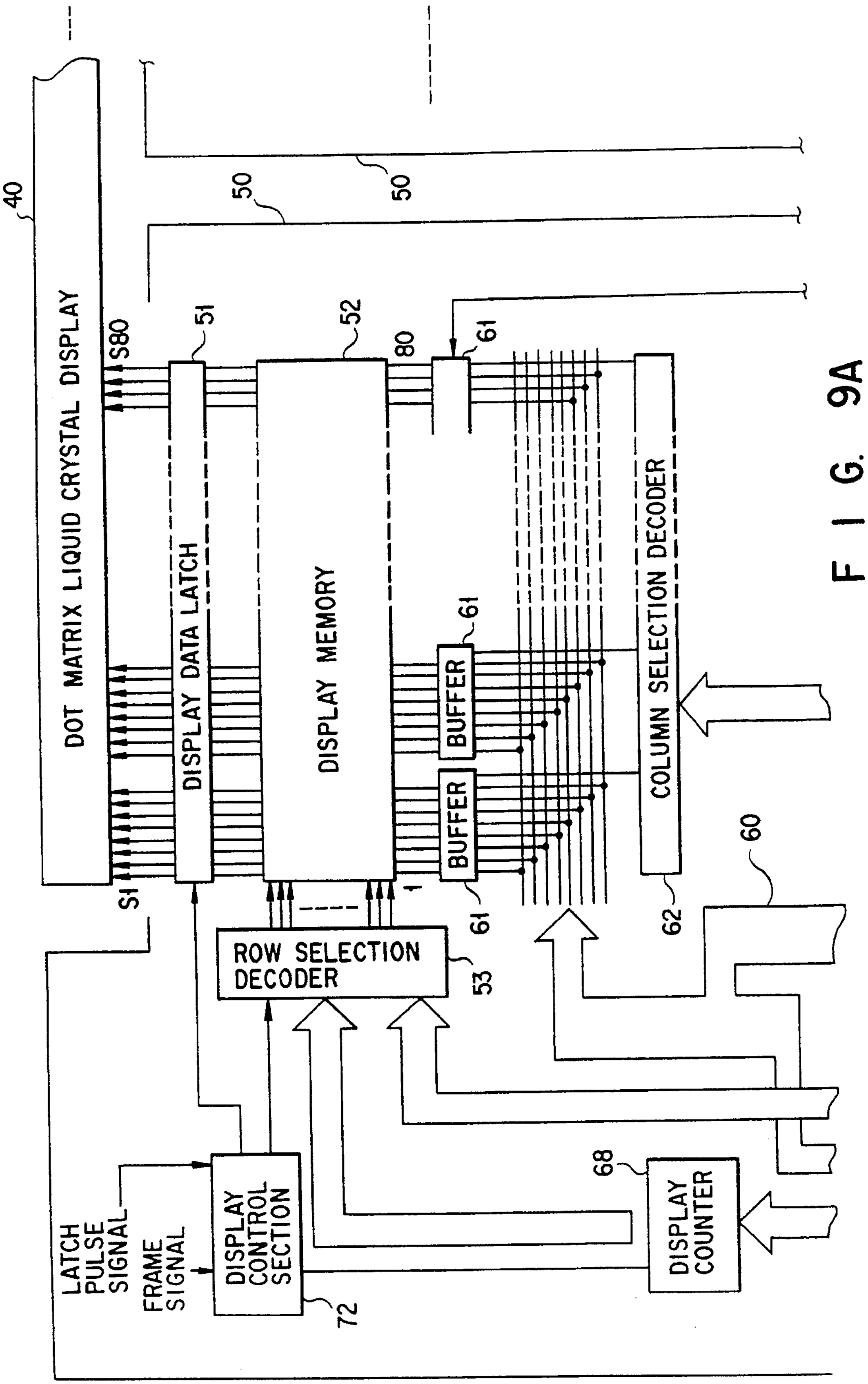
FIGS. 9A and 9B are block diagrams showing the detailed construction of the display system of FIG. 5.
Figure 9B:
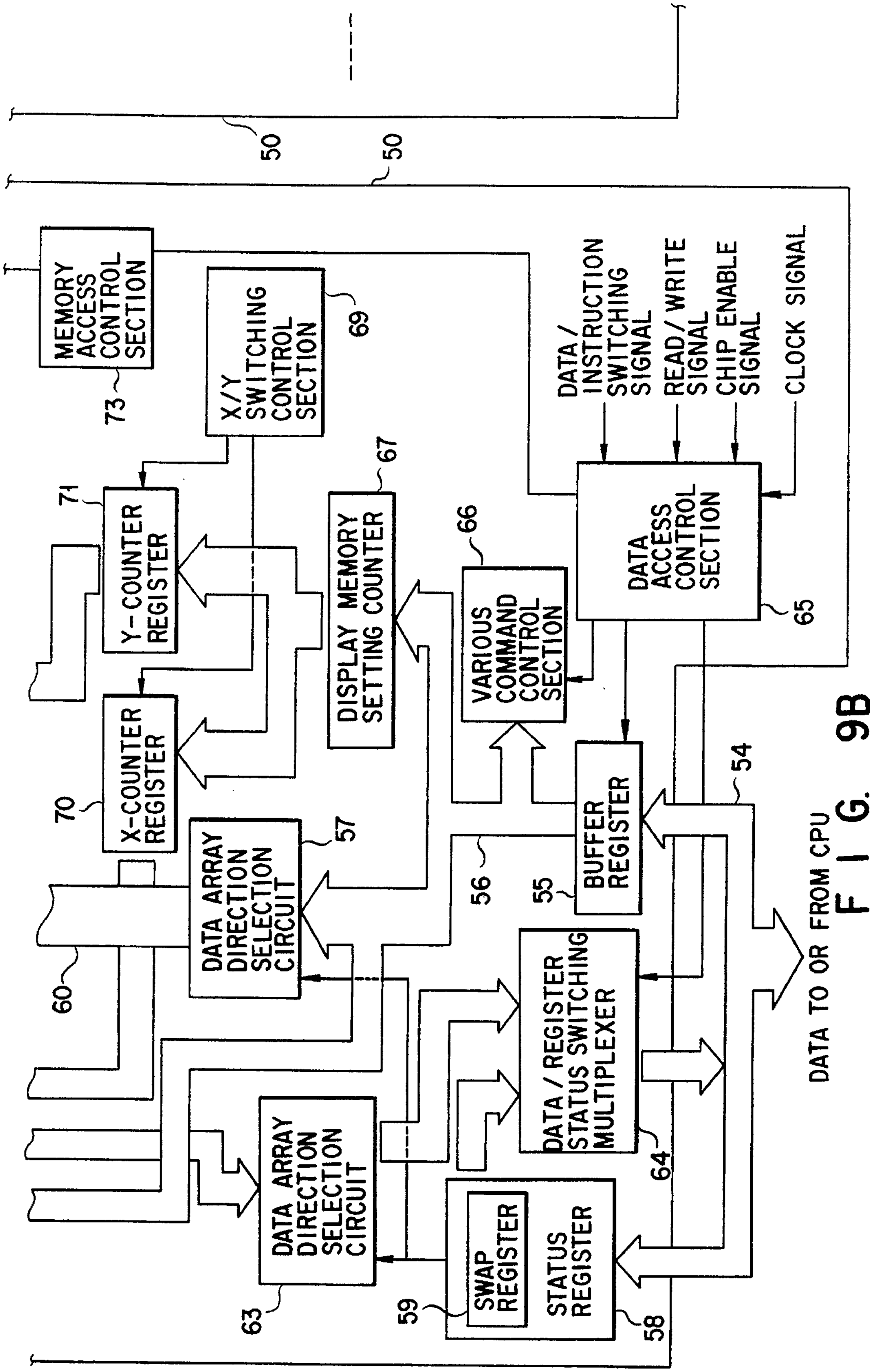

FIGS. 9A and 9B are block diagrams showing the detailed constructions of the described embodiment of the display system. In this example, a dot matrix liquid crystal display unit 40 having XP pixels in the column direction and YP pixels in the row direction is used as the display unit. The display unit 40 is driven by means of a plurality of display driving/controlling integrated circuits as described before, but for brief explanation, only one display driving/controlling integrated circuit 50 is shown in detail in FIG. 9A. In FIG. 9A, reference numeral 51 denotes a display data latch for supplying segment signals to the display unit 40. The display data latch 51 is supplied with display data read out from a display memory 52 corresponding to the display memory 11 of FIG. 4. The display memory 52 has memory cells (not shown) arranged in one-to-one correspondence to the pixels of the display unit 40. Numbers of bit 1 to bit 80 are attached to input lines of the display memory 52. Therefore, eighty output terminals of S1 to S80 are used for segment signals of the display driving/controlling integrated circuit 50. When the number of memory cells in the column direction of the display memory 52 is XM and the number of memory cells in the row direction is YM, and if XM<YP and YM<YP, then a plurality of display driving/controlling integrated circuits 50 are necessary to drive the display unit 40. Display data previously stored in the display memory 52 is selected by rows in response to an output of the row selection decoder 53 and the readout data is supplied to the display data latch 51 as segment driving signals.

In FIG. 9B, reference numeral 54 denotes an external data bus for transferring data output from an external CPU (not shown). Display data on the external data bus 54 is supplied to a buffer register 55 and then input to a data array direction selection circuit 57 corresponding to the data array direction selection circuit 13 via a first internal data bus 56. Then, the data array direction is selected according to the mode control signal SWAP output from a SWAP register 59, which is one of the registers in a status register 58. An output of the data array direction selection circuit 57 is commonly supplied to ten buffers 61 corresponding to the buffers 12 of FIG. 4 via a second internal data bus 60 corresponding to the internal data buses BUS0 to BUS7 of FIG. 4. Then, 8-bit display data transferred on the second internal data bus 60 is stored into one of the ten buffers 61 according to an output of a column selection decoder 62 corresponding to the selection decoder 14 of FIG. 4. Further, data is stored into 8-bit memory cells of the display memory 52, which are selected by outputs of the column selection decoder 62 and the row selection decoder 53.

It is also possible to read out data from the display memory 52 and supply the readout data to the ten buffers 61, and 8-bit memory cells of the display memory 52 from which data is read out are selected by outputs of the column selection decoder 62 and the row selection decoder 53. The readout data is supplied to the external CPU via a readout data array direction selection circuit 63, a data/register switching multiplexer 64 and the external data bus 54.

The multiplexer 64 is supplied with outputs of the data array direction selection circuit 63 and the status register 58. The operation of the data/register status switching multiplexer 64 is controlled by a data access control section 65. The data access control section 65 is supplied with a data/instruction switching signal, read/write signal, chip enable signal and clock signal and determines whether data input to the external data bus 54 from the external CPU is display data or other data such as an instruction or various commands. When the data is an instruction, data on the first internal data bus 56 is input to a various command control section 66 under the control of the data access control section 65 without being stored into the buffer 61. Further, data on the first internal data bus 56 for controlling the operations of the row selection decoder 53 and column selection decoder 62 is input to a display memory setting counter 67 or display counter 68 under the control of the data access control section 65. An output of the display memory setting counter 67 is selectively input to an X-counter register 70 or Y-counter register 71 according to an output of an X/Y switching control section 69. An output of the X-counter register 70 is input to the row selection decoder 53 and an output of the Y-counter register 71 is input to the column selection decoder 62.

The operation of the row selection decoder 53 for selecting a row of the display memory 52 at the data readout/write-in time is controlled by outputs of the X-counter register 70 and display counter 68 and an output of the display control section 72. Further, the display control section 72 is supplied with a latch pulse signal for controlling the latching operation of the display data latch 51 and a frame signal for controlling the display operation. An output of the data access control section 65 is supplied to a memory access control section 73 and the data readout/write-in operation of the buffers 61 is selected under the control of the memory access control section 73.

In the integrated circuit of this embodiment, data in the display memory 52 and the status in the status register 58 can be read out. For example, data in an area of the display memory 52 specified by outputs of the row selection decoder 53 and the column selection decoder 62 is output to the second internal data bus 60 via one of the buffers 61. Data on the second internal data bus 60 is input to the readout data array direction selection circuit 63. The data array direction selection circuit 63 is also supplied with the mode control signal SWAP of the SWAP register 59 of the status register 58. Therefore, 8-bit data read out from the display memory 52 is set into the bit array status which is the same as or inverted with respect to the original status set at the readout time by means of the data array direction selection circuit 63 and the output thereof is output to the external data bus 54 via the data/register status switching multiplexer 64.

That is, even in the inverting mode in which the mode control signal SWAP of the SWAP register 59 is set at the "0" level, when data is read out from the display memory 52 and output to the exterior, the bit array of the data is set to the same bit array status set when data is input,from the exterior.

The X-counter register 70 and Y-counter register 71 have the increment/decrement functions for sequentially specifying display memory areas when display data is written into the display memory 52. The increment function is to sequentially increase the content thereof one by one from an initial value and the decrement function is to decrease the content thereof one by one. The increment/decrement functions of the X-counter register 70 and Y-counter register 71 can be set by inputting an instruction from the exterior in the same manner as in the case of the SWAP register 59. The increment/decrement operation is automatically effected after the operation of writing data into the areas of the display memory 52 is completed.

Data with the inverted bit array direction with respect to the bit array direction of whole 8-bit data inputted into the integrated circuit can be readily used as display data by use of a combination of the bit array control based on the content of the SWAP register 59 used for selecting the bit array status of 8-bit data and the increment/decrement selection function of the counter register 71. At this time, the address setting for writing data into the display memory 52 is automatically effected in the X-counter register 70 and Y-counter register 71. Therefore, when data is written into the display memory 52, it is not necessary for the CPU to calculate the address. For example, the bit array direction of output data supplied to the display unit 40 set when the Y-counter register 71 is selected by the X/Y switching control section 69, when the content of the SWAP register 59 indicates the inverting mode and when decrement function of the register 71 is selected is opposite to the bit array direction of the output data set when the content of the SWAP register 59 indicates the non-inverting mode and the increment function is selected in the register 71.

Additional advantages and modifications will readily occur to those skilled in the art. Therefore, the invention in its broader aspects is not limited to the specific details or representative devices shown and described herein. Accordingly, various modifications may be made without departing from the spirit or scope of the general inventive concept as defined by the appended claims and their equivalents.

What is claimed is:

1. A driving/controlling integrated circuit for a matrix type display, comprising:

a display memory, having memory cells arranged in a matrix form with a plurality of rows and columns and, for storing and outputting data to be supplied to a matrix type display unit;

a bus line of n-bit configuration for transmitting display data to be stored in said display memory with n bits set as one unit;

mode control signal supplying means for supplying a mode control signal for changing the bit array order of the display data; and a data array direction selection circuit connected to said bus line, for outputting display data on said bus line to said display memory with the bit array order thereof set in one of the original bit array order or reversal bit array order with respect to the original bit array order corresponding to a mode control signal SWAP set at "1" or "0".

2. A display driving/controlling integrated circuit according to claim 1, further comprising a plurality of buffers connected to said display memory, for permitting a storage area of said display memory designated by a specified address to be selected.

3. A display driving/controlling integrated circuit comprising:

a display memory for storing and outputting data to be supplied to a display unit;

a bus line of n-bit configuration for transmitting display data to be stored in said display memory with n bits set as one unit;

mode control signal supply means for supplying a mode control signal for changing the bit array order of the display data; and a data array direction selection circuit connected to said bus line, for outputting display data on said bus line to said display memory with the bit array order thereof set in one of the original bit array order and the reversal bit array order with respect to the original bit array order;

wherein said data array direction selection circuit includes n data selection circuits, each of which includes first and second AND gates and an OR gate, wherein said OR gate has input terminals connected to the output terminals of said first and second AND gates, a first input terminal of each of said first AND gates of said n data selection circuits being supplied with a first selection signal, a second input terminal of each of said first AND gates being supplied with a corresponding one of bits of the n-bit display data arranged in an order from the most significant bit to the least significant bit, a first input terminal of each of said second AND gates of said n data selection circuits being supplied with a second selection signal which has a complementary relation with respect to said first selection signal, and a second input terminal of each of said second AND gates being supplied with a corresponding one of bits of the n-bit display data arranged in an order from the least significant bit to the most significant bit.

4. A display system comprising:

a matrix type display unit having a plurality of display pixels which are arranged in row and column directions in a matrix form and which are divided into upper and lower display areas; and a plurality of display driving/controlling integrated circuits for driving and controlling said display pixels, those of said display driving/controlling integrated circuits provided on the lower side of said lower display area outputting display data with a preset bit array order, and those of said display driving/controlling integrated circuits provided on the upper side of said upper display area outputting display data with a reversal bit array order with respect to said preset bit array order, each of said plurality of display driving/controlling integrated circuits including:

a display memory, having memory cells arranged in a matrix form with a plurality of rows and columns and, for storing and outputting data to be supplied to said matrix type display an internal bus line of n-bit configuration for transmitting display data to be stored in said display memory with n bits set as one unit;

mode control signal supplying means for supplying a mode control signal for changing the bit array order of the display data; and a data array direction selection circuit, connected to said internal bus line, for outputting display data on said bus line to said display memory with the bit array order thereof set in one of the original bit array order or the reversal bit array order with respect to the original bit array order corresponding to a mode control signal SWAP set at "1" or "0".

5. A display system according to claim 4, wherein each of said upper and lower display areas is divided into a plurality of areas and said plurality of display driving/controlling integrated circuits are respectively provided for said plurality of areas.

6. A display system according to claim 4, wherein said display unit consists of a dot matrix type liquid crystal display device.

7. A display system comprising:

a display unit having a plurality of display pixels which are arranged in row and column directions in a matrix form and which are divided into upper and lower display areas with the upper and lower display areas composing a display screen; and a plurality of display driving/controlling integrated circuits for driving and controlling said display pixels, those of said display driving/controlling integrated circuits provided on the lower side of said lower display area outputting display data with a preset bit array order, and those of said display driving/controlling integrated circuits provided on the upper side of said upper display area outputting display data with a reversal bit array order with respect to said preset bit array order, each of said plurality of display driving/controlling integrated circuits including:

a display memory for storing data to be supplied to said display unit;

an internal bus line of n-bit configuration for transmitting display data to be stored in said display memory with n bits set as one unit;

mode control signal supplying means for supplying a mode control signal for changing the bit array order of the display data; and a data array direction selection circuit, connected to said internal bus line, for outputting display data on said bus line to said display memory with the bit array order thereof set in one of the original bit array order and the reversal bit array order with respect to the original bit array order, wherein said data array direction selection circuit includes n data selection circuits, each of which includes first and second AND gates and an OR gate, wherein the OR gate has input terminals connected to the output terminals of said first and second AND gates, a first input terminal of each of said first AND gates of said n data selection circuits being supplied with selection information, a second input terminal of each of said first AND gates being supplied with a corresponding one of bits of the n-bit display data arranged in an order from the most significant bit to the least significant bit, a first input terminal of each of said second AND gates of said n data selection circuits being supplied with information having a complementary relation with respect to the selection information, and a second input terminal of each of said second AND gates being supplied with a corresponding one of bits of the n-bit display data arranged in an order from the least significant bit to the most significant bit.

8. A display system according to claim 7, wherein said plurality of display driving/controlling integrated circuits include storing means for storing the selection information.

9. A display system according to claim 7, wherein said display unit consists of a dot matrix type liquid crystal display device.

10. A display system comprising:

a display unit having a plurality of display pixels which are arranged in row and column directions in a matrix form and which are divided into upper and lower display areas; and a plurality of display driving/controlling integrated circuits for driving and controlling said display pixels, those of said display driving/controlling integrated circuits provided on the lower side of said lower display area outputting display data with a preset bit array order, and those of said display driving/controlling integrated circuits provided on the upper side of said upper display area outputting display data with a reversal bit array order with respect to the preset bit array order, each of said plurality of display driving/controlling integrated circuits including a display memory for storing data to be supplied to said display unit, an internal bus line of n-bit configuration for transmitting display data to be stored in said display memory with n bits set as one unit, mode control signal supplying means for supplying a mode control signal for changing the bit array order of the display data, and a data array direction selection circuit connected to said internal bus line, for outputting display data on said bus line to said display memory with the bit array order thereof set in one of the original bit array order and the reversal bit array order with respect to the original bit array order;

wherein said data array direction selection circuit includes n data selection circuits each of which includes first and second AND gates and an OR gate, wherein the OR gate has input terminals connected to the output terminals of said first and second AND gates, a first input terminal of each of said first AND gates of said n data selection circuits being supplied with selection information, a second input terminal of each of said first AND gates being supplied with a corresponding one of bits of the n-bit display data arranged in an order from the most significant bit to the least significant bit, a first input terminal of each of said second AND gates of said n data selection circuits being supplied with information having a complementary relation with respect to the selection information, and a second input terminal of each of said second AND gates being supplied with a corresponding one of bits of the n-bit display data arranged in an order from the least significant bit to the most significant bit.

11. A display system according to claim 10, wherein said plurality of display driving/controlling integrated circuits includes storing means for storing the selection information.

12. A display system according to claim 10, wherein said display unit consists of a dot matrix type liquid crystal display device.

* * * * *